United States Patent [19]

Munn et al.

[11] Patent Number: 5,258,201
[45] Date of Patent: Nov. 2, 1993

[54] METHOD OF FORMING A PARTIAL COATING ON PHOSPHOR PARTICLES BY COATING THE PHOSPHORS IN A FLUIDIZE BED FOR A LIMITED TIME AND SUBSEQUENTLY ANNEALING TO PROMOTE IONIC DIFFUSION

[76] Inventors: Robin W. Munn, 303 Harrison St., Sayre, Pa. 18840; Dale E. Benjamin, R.D. 1, Box 230, Athens, Pa. 18810; Deborah V. Lutz, R.D. 1, Box 49, Troy, Pa. 16947

[21] Appl. No.: 949,374

[22] Filed: Sep. 23, 1992

Related U.S. Application Data

[63] Continuation of Ser. No. 852,829, Mar. 13, 1992, abandoned, which is a continuation of Ser. No. 723,707, Jun. 24, 1991, abandoned, which is a continuation of Ser. No. 584,235, Sep. 17, 1990, abandoned.

[51] Int. Cl.$^5$ ............................................. B05D 5/06
[52] U.S. Cl. ......................................... 427/64; 427/67; 427/126.2; 427/126.3; 427/126.4; 427/157; 427/185; 427/213; 427/215; 427/376.2
[58] Field of Search ................. 427/64, 67, 185, 213, 427/215, 126.2, 126.3, 126.4, 157, 376.2

[56] References Cited

U.S. PATENT DOCUMENTS

| | | | |
|---|---|---|---|
| 4,585,673 | 4/1986 | Sigai | 427/213 |
| 4,691,140 | 9/1987 | Sakakibara et al. | 313/486 |
| 4,710,674 | 12/1987 | Sigai | 313/489 |
| 4,892,757 | 1/1990 | Kasenga et al. | 427/215 |
| 4,925,703 | 5/1990 | Kasenga et al. | 427/215 |
| 4,956,202 | 9/1990 | Kasenga et al. | 427/215 |

Primary Examiner—Shrive Beck
Assistant Examiner—Benjamin L. Utech
Attorney, Agent, or Firm—Elizabeth A. Levy

[57] ABSTRACT

A method of forming a partial protective coating on phosphor particles to improve initial power output and maintenance of fluorescent lamps made with the phosphor. The phosphor particles are fluidized in a bed and at least partially enveloped by a coating precursor material. Residence time of the phosphor particles in the fluidized bed is short so that the phosphor particles are only partially coated with the coating precursor material. The coating precursor material is reacted to form a protective coating over at least a portion of the surface of the phosphor particles. The partially-coated phosphor particles are then annealed to cause the protective coating to selectively cover at least a portion of certain sites on the surface of the phosphor particles.

10 Claims, No Drawings

METHOD OF FORMING A PARTIAL COATING ON PHOSPHOR PARTICLES BY COATING THE PHOSPHORS IN A FLUIDIZE BED FOR A LIMITED TIME AND SUBSEQUENTLY ANNEALING TO PROMOTE IONIC DIFFUSION

This is a continuation of copending application Ser. No. 07/852,829, now abandoned, filed on Mar. 13, 1992, which was a continuation of copending application Ser. No. 07/723,707, filed on Jun. 24, 1991, now abandoned, which was a continuation of copending application Ser. No. 07/584,235, filed on Sep. 17, 1990, now abandoned.

CROSS-REFERENCES TO RELATED APPLICATIONS

Information pertinent to this application is described and claimed in copending Ser. No. 07/584,226, filed concurrently with this application and assigned to the assignee of the instant invention.

TECHNICAL FIELD

This invention relates to a method of partially coating a phosphor particle so as to improve initial power output and maintenance of the phosphor.

BACKGROUND OF THE INVENTION

Phosphors are used in mercury vapor discharge lamps and viewing screens of various electronic devices. It has been recognized that various improvements in the performance of phosphors can be obtained if the phosphor material is coated with a protective film or pigment. Such coatings have been applied, for example, by using selective additions to a lamp coating suspension, or by suspending particles of the phosphor in a solution containing the coating material and evaporating the solvent to form coated phosphor particles.

One method, described in U.S. Pat. No. 4,585,673 to Sigai, the teachings of which are hereby incorporated by reference, involves the formation of a continuous coating by gas-phase chemical vapor deposition of the coating material on the phosphor particles while the particles are suspended in a fluidized bed.

U.S. patent application Ser. No. 07/430,546, now abandoned, copending and commonly assigned to the assignee of the instant application, entitled "Method for Coating Phosphor Particles" to Munn et al., the teachings of which are hereby incorporated by reference, describes a method for applying a coating to phosphor particles.

SUMMARY OF THE INVENTION

It is an object of this invention to provide a method of forming a partial protective coating on phosphor particles.

According to one aspect of the invention, there is provided a method of forming a partial protective coating on phosphor particles, comprising the steps of: fluidizing particles of a phosphor powder in a fluidized bed; exposing the fluidized particles to a vaporized coating precursor at a first temperature to at least partially envelop the particles with coating precursor material, the first temperature being less than the temperature at which the coating precursor material decomposes; reacting the coating precursor material enveloping the fluidized particles at a second temperature to form a protective coating over at least a portion of the surface of individual phosphor particles, the second temperature being greater than or equal to the temperature at which the coating precursor material reacts to form the protective coating; and annealing the coated phosphor particles at a sufficient temperature for a sufficient time to cause portions of the surface of the individual phosphor particles to become exposed, whereby the individual phosphor particles are partially coated with the protective coating.

DETAILED DESCRIPTION OF THE INVENTION

The method of the invention involves the formation of a partial protective coating on phosphor particles by gas-phase chemical vapor deposition while the phosphor particles are suspended within a fluidized bed. The fluidized particles are exposed to a vaporized precursor material at a first temperature, the first temperature being less than the temperature at which the precursor material decomposes. Before the particles have been completely enveloped by the precursor material, the precursor material is reacted at a second temperature to form a protective coating over at least a portion of the surface of individual phosphor particles, the second temperature being greater than or equal to the temperature at which the precursor material reacts to form the protective coating material. The phosphor particles on which the protective coating has thus been formed are then annealed to expose at least a portion of the surface of the individual phosphor particles, thereby forming a partial protective coating on the surface of the individual phosphor particles.

The fluidized bed is formed by passing an inert gas upwardly through the phosphor particles in order to suspend the particles in the inert gas stream. Examples of inert gases suitable for use in this method include nitrogen, argon, helium, neon or mixtures thereof. In addition to supporting the phosphor particles in a fluidized bed, the inert gas functions as a carrier gas. A volatilizable coating precursor material is vaporized into the inert gas before the inert gas enters the reaction chamber in which the phosphor particles become suspended. Preferably the carrier gas is saturated with the vapor of the coating precursor material. As the carrier gas containing the vaporized coating precursor material passes upwardly through the phosphor particles to suspend the particles in the fluidized bed, the particles are enveloped by the vapor of the coating precursor material which is contained in the carrier gas.

The fluidized bed is preferably maintained in a temperature gradient ranging from a lowest temperature to a highest temperature. The lowest temperature should be less than the temperature at which the coating precursor material will decompose, while the highest temperature should be equal to or greater than the temperature at which the coating precursor material reacts to form the protective coating.

An oxidizing gas, if necessary, is introduced into the fluidized bed separately from the carrier gas containing the vaporized coating precursor material. Examples of suitable oxidizing gases are air or oxygen. The oxidizing gas may be mixed with a diluent inert gas.

The residence time of the phosphor powder particles in the fluidized bed in the method of this invention is significantly less than the time required to form a continuous protective coating over the individual phosphor particles. It has been found that a residence time in the fluidized bed of at least four hours is sufficient to form a complete, continuous protective coating over phosphor particles. Since only a partial coating is desired, it is essential that the residence time of the phosphor in the fluidized bed be kept to a minimum, say for 30 minutes to one hour at the most, such that only a partial coating of precursor coating material is formed on the particles. The residence time of the phosphor in the fluidized bed is thus so short that the phosphor powder particles are not completely enveloped by the vaporized precursor coating material.

During the reaction step the coating precursor material is reacted to form a protective coating on that portion of the phosphor particle surfaces which was enveloped by the vaporized coating precursor material. For example, lead-activated barium silicate phosphor can be sufficiently partially coated after about 30 minutes in the fluidized bed. The partially coated phosphor is then removed from the fluidized bed and transferred to an oven or furnace for annealing.

The annealing step which follows the reaction step causes the protective coating on the surface of the individual phosphor particles to selectively cover at least a portion of certain sites on the surface of the phosphor particles. It is believed that the annealing step may promote ionic diffusion between the protective coating and the underlying phosphor, causing the resulting partial coating to comprise a mixture of the original coating and a new compound or compounds formed from such ionic diffusion.

Examples of phosphor coating materials that can be applied by the present method include metal or nonmetal oxides. Preferred coating materials are aluminum oxide and silicon dioxide. For a chemical compound or chemical composition to be suitable for use as coating precursor material in the method of the present invention, the compound or composition must be volatilizable. Organo and alkoxide compounds of the metal or nonmetal of the desired oxide coating material which are volatilizable under the conditions of the present method may be used as coating precursor materials in the present invention. Acetylacetonates of the metal of the desired oxide coating material can also be used as precursor materials in the present method.

For example, some suitable aluminum oxide precursor materials are represented by the general formula $R_x(OR')_{3-x}Al$, wherein x is an integer between 0 and 3 inclusive, and R and R' are lower alkyl groups, such as: $-CH_3$; $-C_2H_5$; $-C_3H_7$; or $-C_4H_9$. Examples of suitable silicon dioxide precursor materials are represented by the general formula $R_x(OR')_{4-x}Si$, wherein x is an integer between 0 and 4 inclusive, and R and R' are lower alkyl groups, such as $-CH_3$; $-C_2H_5$; $-C_3H_7$; $-C_4H_9$; or $-C_5H_{11}$.

The listing of examples of suitable coating precursor material for aluminum oxide or silicon dioxide coatings is not to be construed as necessarily limiting thereof. Any alkyl, alkoxy, or acetylacetonate compounds of aluminum or silicon which can be vaporized into the inert carrier gas under the conditions of the method may be used as coating precursor material for aluminum oxide coatings or silicon dioxide coatings, respectively.

Phosphor powders having an average particle size range of about 20 to 80 microns and larger can be fluidized with little or no difficulty. Difficulty is encountered, however, in attempting to fluidize fine phosphor powders, i.e., phosphor powders having an average particle size of less than about 20 microns. The difficulty in fluidizing the particles of fine phosphor powder arises from interparticle adhesive forces which cause agglomeration and bridging between the agglomerates. Such agglomeration and bridging of agglomerates normally results in the formation of channels through the bed thereby causing the gas to pass through the channels without fluidizing the particles. Under these circumstances, there is little or no powder bed expansion.

Particles of fine phosphor powders, such as lead-activated barium silicate phosphors which fall within class "C" of the Geldart classification scale, can be fluidized and coated by the method of the present invention. To fluidize particles of a fine phosphor powder in the method of the present invention, a small amount, up to about 1 weight percent with respect to the phosphor, of a fluidizing aid should be mixed with the phosphor powder to form a uniform mixture. Preferably, an amount of fluidizing aid less than or equal to about 0.05 weight percent with respect to the phosphor is employed. Suitable fluidizing aids include small particle size aluminum oxide, e.g., Aluminum Oxide C, or small particle size silica. Fluidization of fine phosphor powders can alternatively be accomplished by additional agitation of the phosphor powder particles which are suspended in the stream of carrier gas. This additional agitation can be accomplished by various agitating means, such as a mechanical stirrer, and preferably a high speed vibromixer.

By reacting the precursor material before the vapor of the precursor material has completely enveloped the phosphor particle surface, the resulting protective coating only partially covers the phosphor particle surface. Electron spectroscopy analysis indicates that, depending on the stoichiometry of the phosphor, certain components of the phosphor at the surface of the phosphor particle will be covered with the protective coating before other components of the phosphor are covered. For example, in the case of a lead-activated barium silicate phosphor, there are two silica ions for each barium ion. The barium ions have a greater tendency than the silica ions to bond with other ions or compounds because of the stable tetrahedral structure of silica.

The annealing step is believed to promote ionic diffusion between the phosphor components on the surface of the phosphor particle and the protective coating material, possibly causing the formation of a thin layer of a new compound as part of the coating of the phosphor. In the case of barium silicate phosphor, such a new compound may comprise, e.g., aluminum silicate. It is this ionic diffusion that causes the protective coating material to preferentially cover certain sites on the surface of the phosphor particles. The overall effect of this ionic diffusion during the annealing step is that the more mobile ions have an affinity for one another, whereas less mobile ions are relatively unaffected, such that the protective coating preferentially covers more of certain sites than others on the surface of the phosphor particle. Thus, protection for the phosphor is obtained, with consequent improvements in output and maintenance, with only a partial protective coating because of the affinity of the coating for certain components of the underlying phosphor.

The annealing step is carried out in air at a temperature of from about 700° C. to about 850° C. for a period of from about 15 minutes to about 20 hours. The preferred annealing conditions for lead-activated barium silicate phosphor are 780° C. for 4 hours. It is believed that the annealing process causes the protective coating on the phosphor particles to preferentially cover certain sites on the phosphor surface, leaving other sites exposed. This theory is supported by electron spectroscopy analysis which shows a greater degree of attenuation of certain components of the phosphor before the annealing step. The annealing process may remove any moisture present in the protective coating or in the phosphor. It may also improve the adherence of the protective coating on the phosphor particle surface. As previously mentioned, ionic diffusion of the components of the phosphor and the components of the protective coating may result in the formation of a new compound or compounds on the surface of the phosphor.

The resulting coated, annealed phosphor exhibits improved initial power output and improved maintenance at 100 hours when compared to an uncoated, unannealed phosphor.

The following non-limiting example is presented.

EXAMPLE I

The apparatus described in U.S. patent application Ser. No. 07/430,546, previously incorporated by reference, was used for the method of this invention and for this example.

Particles of lead-activated barium silicate phosphor powder were partially coated with aluminum oxide by the method of the present invention. A fluidized bed having a quartz tube reactor vessel with a 4-inch inside diameter was used. Seven kilograms of lead-activated barium silicate (Sylvania Type 2011, obtained from the Chemical and Metallurgical Division of GTE Products Corporation, Towanda, Pa.) and 7 grams (0.1 weight percent) Aluminum Oxide C, the fluidizing aid (available from DeGussa, Inc.) were dry blended in a polyethylene jar to obtain a uniform dispersion of the Aluminum Oxide C fluidizing aid throughout the barium silicate phosphor powder. The mixture of the barium silicate phosphor powder and the fluidizing aid was introduced into the quartz tube reactor vessel. Liquid trimethyl aluminum was used in the stainless steel bubbler as the coating precursor material. Nitrogen gas was bubbled into the liquid trimethyl aluminum to form a carrier gas containing vaporized trimethyl aluminum. The resulting vapor-containing gas stream was diluted with additional nitrogen gas and then introduced into the reactor vessel.

The phosphor powder was heated using 15 liters per minute pure nitrogen as the fluidizing gas. The nitrogen was preheated to 50° C., and the fluidized bed was preheated to 700° C. When the fluidized bed reached a temperature of 400° C., oxygen was introduced to the reactor at a rate of 8 liters per minute, and the nitrogen flow was reduced to 7 liters per minute. After 5 minutes, 5 liters per minute of the nitrogen was diverted through the bubbler and the vapor-laden bubble exit stream was diluted with 2 liters per minute of pure nitrogen to comprise the fluidizing-coating gas.

The process was continued for 30 minutes. An aluminum oxide coating comprising 0.47% by weight of the phosphor was formed on the phosphor particles. Electron spectroscopy analysis indicated that approximately 80% of the barium, and approximately 84% of the silica, on the surface of the phosphor particles was covered by the aluminum oxide coating.

The phosphor was then annealed at 780° C. for 4 hours in air. Electron spectroscopy analysis after the annealing step indicated that none of the barium, and only 17% of the silica, on the surface of the phosphor particles was covered by the aluminum oxide coating.

The coated, annealed phosphor was then fabricated into 72-inch T12HO (high-output) fluorescent lamps using standard organic suspension methods. These lamps were tested alongside lamps fabricated from the uncoated, unannealed barium silicate phosphor base lot. The initial power output and maintenance data from these lamp tests are indicated in Table I.

TABLE I

OUTPUT AND MAINTENANCE OF COATED/ANNEALED AND UNCOATED/UNANNEALED $BaSi_2O_5$:Pb PHOSPHOR

| | UVA | UVB | MAINTENANCE AT 100 HRS |
|---|---|---|---|
| WITH INTEGRATED REFLECTOR | | | |
| COATED/ANNEALED | 10.4 mW | 7.3 mW | 79.7% |
| UNCOATED/UNANNEALED | 10.0 mW | 7.1 mW | 62.6% |
| WITHOUT INTEGRATED REFLECTOR | | | |
| COATED/ANNEALED | 10.82 mW | 5.25 mW | 82.3% |
| UNCOATED/UNANNEALED | 10.56 mW | 5.15 mW | 70.8% |

The data indicate that initial UVA power output for lamps made with the coated, annealed phosphor is up to 4% greater than that of lamps made with the uncoated, unannealed phosphor. Maintenance of lamps made with the coated, annealed phosphor is improved by up to 27% over that of lamps made with the uncoated, unannealed phosphor. Lamps made with an integrated reflector show greater improvement in both initial power output and maintenance at 100 hours than lamps without an integrated reflector. Maintenance at 100 hours is defined as (lumen output at 100 hours) X 100%. (lumen output at 0 hours)

While there has been shown and described what at present are considered preferred embodiments of the invention, it will be obvious to those skilled in the art that various changes and modifications may be made therein without departing from the scope of the invention as defined by the appended claims.

What is claimed is:

1. A method of forming a partial protective coating on phosphor particles, said method comprising the steps of:
    a) fluidizing particles of a phosphor powder in a fluidized bed;
    b) exposing the fluidized particles to a vaporized coating precursor at a first temperature for 30 minutes to one hour to partially envelop said particles with said coating precursor material, said first temperature being less than the temperature at which said coating precursor material decomposes;
    c) reacting said coating precursor material partially enveloping said fluidized particles at a second temperature to form a protective coating over the portion of the surface of individual phosphor particles that was enveloped by said coating precursor material, said second temperature being greater than or equal to the temperature at which said coating precursor material reacts to form said protective coating; and
    d) annealing the partially coated phosphor particles at a sufficient temperature for a sufficient time to promote ionic diffusion between said phosphor particles and said protective coating to form a partial protective coating comprising said coating precursor material and a compound formed from a reaction between said coating precursor material and said phosphor particles.

2. The method of claim 1 wherein said protective coating is a metal oxide.

3. The method of claim 2 wherein said protective coating is aluminum oxide.

4. The method of claim 1 wherein said protective coating is a nonmetal oxide.

5. The method of claim 4 wherein said protective coating is silicon dioxide.

6. The method of claim 1 wherein said phosphor powder comprises a uniform mixture of a fine phosphor powder and up to about 1 weight percent fluidizing aid.

7. The method of claim 6 wherein said fluidizing aid is small particle size aluminum oxide.

8. The method of claim 1 wherein said annealing step occurs at from about 700° C. to about 850° C. for about 15 minutes to about 20 hours.

9. The method of claim 8 wherein said annealing step occurs at about 780° C. for about 4 hours.

10. The method of claim 1 wherein said annealing step occurs in air.

* * * * *